UNITED STATES PATENT OFFICE.

DAVID CANNON AND HEMAN S. LUCAS, OF CHESTER, MASSACHUSETTS.

IMPROVEMENT IN COMPOSITION FOR FIRE-BRICKS.

Specification forming part of Letters Patent No. 5,198, dated July 24, 1847.

*To all whom it may concern:*

Be it known that we, DAVID CANNON and HEMAN S. LUCAS, of Chester, county of Hampden, and State of Massachusetts, have invented a new and useful Composition of Matter for the Purpose of Lining Coal-Stoves, Furnaces, Ovens, Foundries, &c., to be called the "Soapstone Compound;" and we do hereby declare that the following is a full and exact description.

The nature of our invention consists in compounding soapstone, clay, and borax so as to retain and radiate heat, affording protection when applied as a lining to surfaces exposed to great heat.

To enable others to make and use our invention, we will proceed to describe the manner of making and using it.

Take, by weight, three parts of ground soapstone and one part of clay, mixed with water, and thoroughly work to the consistency of common mortar. It is then to be plastered or molded with a trowel or other instrument into the stove, furnace, or other articles which require a lining to protect them from heat. Then let it thoroughly dry. Then wash the side exposed to heat with a strong solution of borax and water. Then heat it to the degree of redness or higher, and it becomes hard. The higher it is heated the harder it becomes. It is then ready for use.

What we claim as our invention, and desire to secure by Letters Patent, is—

The compounding of soapstone, clay, and borax in proportions as above described, or in similar proportions to produce the like result.

DAVID CANNON.
HEMAN S. LUCAS.

Witnesses:
LAURENS M. ROOT,
JOSEPH B. PARISH.